(12) United States Patent
Tomita

(10) Patent No.: US 8,102,490 B2
(45) Date of Patent: Jan. 24, 2012

(54) DISPLAY ELEMENT WITH DISPLAYING PATTERN FEATURE

(75) Inventor: Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 11/856,467

(22) Filed: Sep. 17, 2007

(65) Prior Publication Data

US 2008/0068544 A1 Mar. 20, 2008

Related U.S. Application Data

(63) Continuation of application No. PCT/JP2005/005036, filed on Mar. 18, 2005.

(51) Int. Cl.
*G02F 1/1335* (2006.01)
*C09K 19/02* (2006.01)

(52) U.S. Cl. .................. 349/115; 349/175; 349/185

(58) Field of Classification Search .................. 349/115, 349/175, 185
See application file for complete search history.

(56) References Cited

U.S. PATENT DOCUMENTS

| | | | | |
|---|---|---|---|---|
| 3,914,019 A | * | 10/1975 | Byatt | 349/139 |
| 5,604,616 A | * | 2/1997 | Dunn et al. | 349/168 |
| 5,808,711 A | * | 9/1998 | Suppelsa et al. | 349/74 |
| 2002/0089479 A1 | | 7/2002 | Sato et al. | |
| 2006/0176410 A1 | | 8/2006 | Nose et al. | |
| 2006/0198629 A1 | | 9/2006 | Tomita et al. | |

FOREIGN PATENT DOCUMENTS

| | | |
|---|---|---|
| EP | 1182494 A1 | 2/2002 |
| JP | 53-035564 A | 4/1978 |
| JP | 11-337672 A | 12/1999 |
| JP | 2002-148660 A | 5/2002 |
| JP | 2002-229051 A | 8/2002 |
| WO | 2005024499 A1 | 3/2005 |
| WO | 2005024504 A1 | 3/2005 |

OTHER PUBLICATIONS

Partial translation of Taiwanese Office Action "Notice Rejection Grounds" of Oct. 13, 2006.
International Search Report of PCT/JP2005/005036, date of mailing: Jun. 28, 2005.
Taiwanese Office Action dated Jan. 29, 2008, issued in corresponding Taiwanese Patent Application No. 094109862 with English translation.
European Search Report dated Oct. 20, 2008, issued in corresponding European Patent Application No. 05721186.4.
"Chinese second written opinion", Partial translation, Appln. No. 200580049155.3, dated Sep. 18, 2009.
"Korean Notice of preliminary rejection", Partial translation, Appln. No. 10-2009-7010753, dated Aug. 31, 2009.

* cited by examiner

*Primary Examiner* — Hoan C Nguyen
(74) *Attorney, Agent, or Firm* — Fujitsu Patent Center

(57) ABSTRACT

In order to provide a cholesteric liquid crystal display element of a structure capable of forming a color in the background by means of a low cost electrode structure and burying an Off display color completely in the background color, the color of the display part and background part of the display element is formed by a color reflection state and a transparent state. This configuration makes it possible to form a color in the background so as to bury the Off display color completely in the background by employing a low cost electrode structure, thereby improving a suitability to an industrial design and accomplish a display of a good visibility.

7 Claims, 17 Drawing Sheets

PREVENT A DISPLAY CHANGE ON THE WIRING
SEGMENT ELECTRODE PATTERN 110
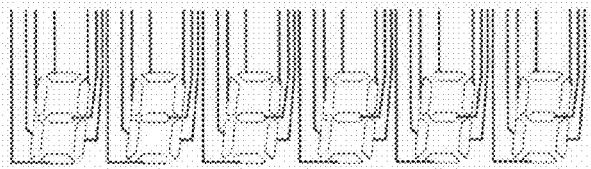
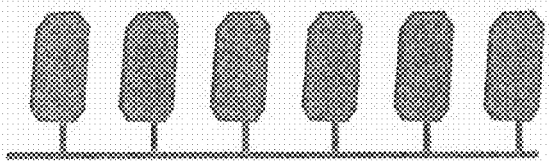
160 COMMON ELCTRODE PATTERN
F I G. 6

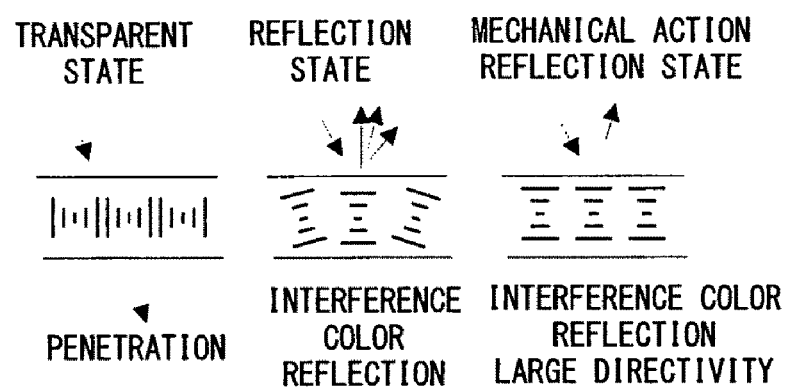
F I G. 7

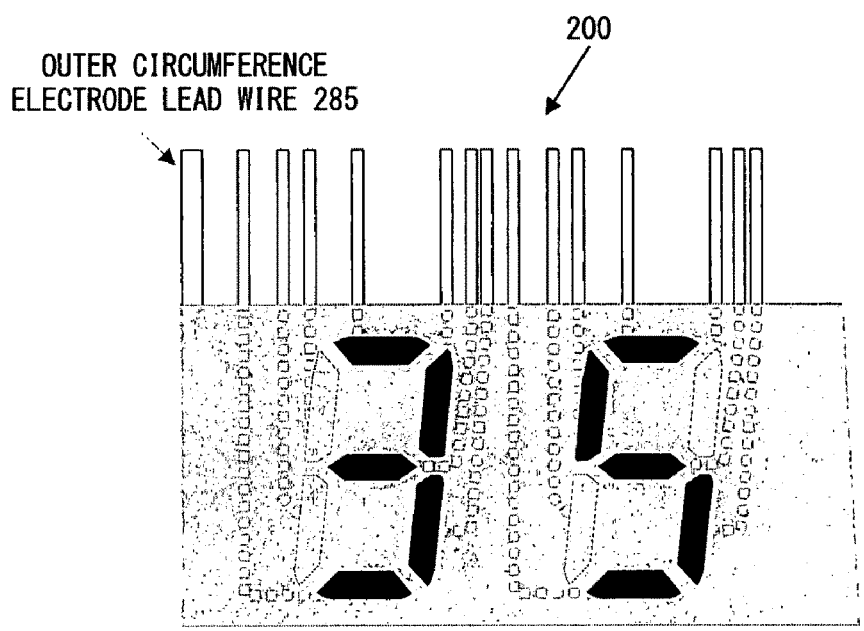
F I G. 8

OUTER CIRCUMFERENCE ELECTRODE 280

| COMBINATION EXAMPLE | (1) | (2) | (3) | (4) |
|---|---|---|---|---|
| PATTERN | BLACK | TRANSPARENT | BLACK | TRANSPARENT |
| FLAT TYPE PATTERN | BLACK | BLACK | TRANSPARENT | TRANSPARENT |

TRANSPARENT LAYER: ORIENTED FILM, INSULATION FILM, ETC.

FIG. 11C

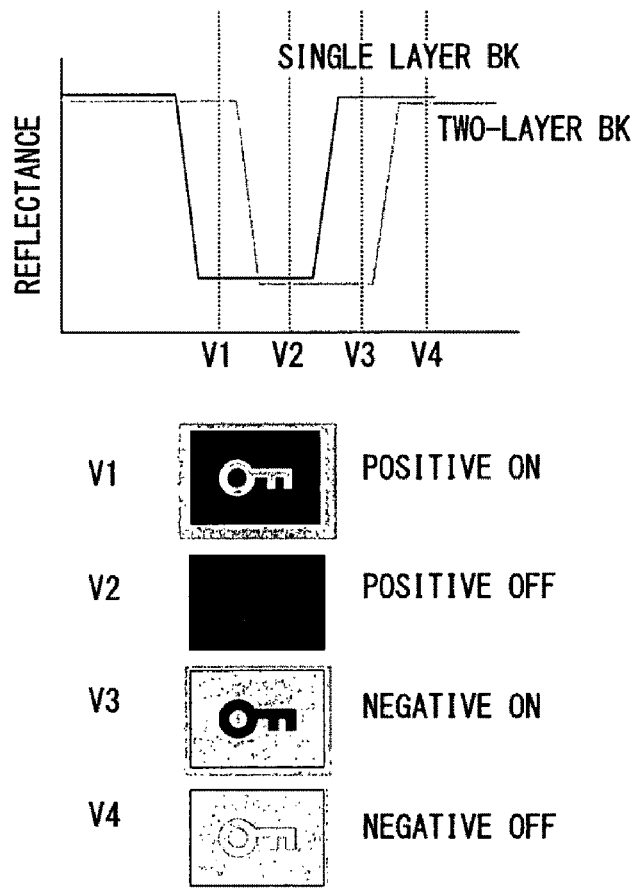
F I G. 12

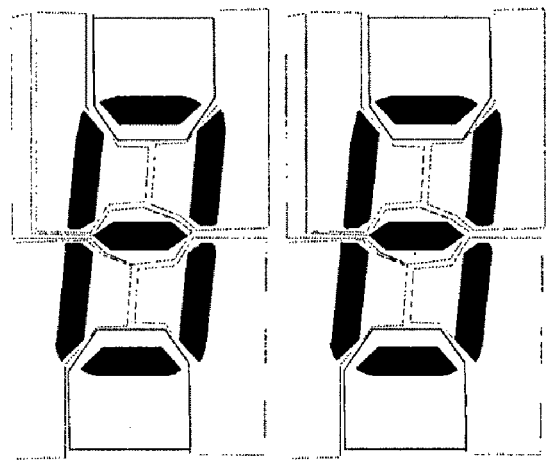
7 SEGMENT DISPLAY
F I G. 1 3

DISPLAY ELEMENT WITH DISPLAYING PATTERN FEATURE

CROSS-REFERENCE TO RELATED APPLICATIONS

This application is a continuation of international PCT application No. PCT/JP2005/005036 filed on Mar. 18, 2005.

BACKGROUND OF THE INVENTION

1. Field of the Invention

The present invention relates to a display apparatus using a cholesteric liquid crystal with an image memory function that the apparatus is capable of retaining a display state without requiring electric power (noted as "power" hereinafter), and particularly to a background color forming method for a cholesteric liquid crystal display (LCD) element.

2. Description of the Related Art

Recent years have been witnessing a use of a cholesteric LCD element capable of retaining a display state without requiring the electricity, that is, capable of performing an image memory display, as a segment type display apparatus, et cetera. The cholesteric liquid crystal noted here is precisely defined as a selective reflection type cholesteric liquid crystal which has two stable states, i.e., an interference reflection state (i.e., a color reflection) for reflecting only a specific color and a transparent state (i.e., black) for transmitting light and which has a characteristic, namely a bistability, of being capable of retaining respective display states without requiring a power after being electrically driven. The cholesteric liquid crystal has a spiral molecular structure and a property of selective reflection reflecting only a light of a wavelength corresponding to the pitch of the spiral in the interference reflection state. Therefore, a use of a cholesteric liquid crystal having a spiral of a pitch corresponding to a wavelength of a color to be desirably reflected enables a desired color display.

Meanwhile, the cholesteric liquid crystal also has a property of mutual transition between the interference reflection state and transparent state which is caused by an external pressure and/or a thermal environment. Because of this, there is a problem of being very difficult to revert back to an initial state if an external action results in a change of states in a part in which a counter electrode does not exist, such as an outer circumferential part of a segment and in between electrode wirings.

Therefore, in an LCD apparatus, such as a conventional segment type display apparatus, a background color has been limited to black even though the segment part is a color display as shown in FIG. 1. In the technical fields, such as clock, marker display, et cetera, putting emphasis on an industrial design, however, a colorful background is highly desired as shown in FIG. 2.

The following is a description of reason for a background color being limited to black in a conventional display element using a conventional cholesteric liquid crystal by referring to FIGS. 3 and 4.

FIG. 3 is a diagram of a conventional cholesteric liquid crystal display element 10 when looking at it from the display surface side. FIG. 3 shows an example of a segment display of the number "35" in color with black as the background. Also shown are segment lead wires 12 for applying a voltage to each segment electrode 11.

FIG. 4 shows a cross-section of the conventional cholesteric LCD element 10.

What are shown here are, from the display surface side, a layer of segment electrodes 11 and light-shield film 13, a liquid crystal unit (i.e., a cell) 14 filled with a cholesteric liquid crystal, a light absorption layer 15, a common electrode (i.e., a flat type electrode) 16 and a glass substrate 17, while segment lead wires 12 are omitted. The segment electrodes 11 are transparent, while the light-shield film 13 and light absorption layer 15 are black.

In the conventional cholesteric LCD element 10, a part which is a background part other than a segment part where there is no counter electrode pair part such as the segment electrode 11 and common electrode 16 is made black by forming the light-shield film 13 shielding a cell 14 of which the state can possibly be changed by an external action so as to make a reflection color of a segment as an On display and a black color of a transparent state, which is the same as the background color, as an Off display. This accordingly limits the background color to black.

It is of course easily possible to conceive a method for making a colorful background by coloring the light-shield film 13 to form a background color, and reversibly displaying negative (On) and positive (Off) displays; which, however, requires a segment reflection color to be exactly identical with a background color in order to bury the display color completely in the background. The reflection color of a segment is an interference reflection color of a liquid crystal expressing a special shade dependent on a view angle and it is therefore very difficult to make it identical with the background color which is colored with a pigment or dye.

Meanwhile, it is possible to form a background color by using a liquid crystal by comprising a background-use electrode; an inter-electrode space of tens micrometers needs to be formed for insulating a border with a display pattern electrode, however. Because of this space, it is not possible to bury the display color completely in the background.

As an example, each of the following reference patent documents 1 and 2 notes an LCD element forming a background color by comprising a background-use electrode; either of them, however, has not been able to bury the display color completely in the background since there is a gap, although it may be very small, between the electrode for the display pattern and that for the background.

As a configuration colorizing a background, the following reference patent document 3 notes a display element filling display cell with a liquid crystal, in which a transition from a cholesteric phase to a nematic phase is caused by applying an electrical field, added with a multi-color dye, and controlling a hue by applying an electrical field, thereby performing a display. This display element, however, has no image memory function and therefore a constant application of the electrical field is required for maintaining a display state.

Patent document 1: Japanese Published Patent Application No. H11-337672

Patent document 2: Japanese Published Patent Application No. 2002-229051

Patent document 3: Japanese Published Patent Application No. S53-35564

SUMMARY OF THE INVENTION

The problem for the present invention to be solved is to provide a cholesteric LCD element of a structure which is capable of forming a color background by using a low cost electrode structure and burying an Off display color completely in a background color.

For that purpose, the present invention is contrived to form a display part and a background part of the display element by means of a color reflection state and a transparent state of the cholesteric liquid crystal. The background is fixed to the color reflection state by employing a mechanical pressure for example. An alternative configuration is to make an electrode for the background and that for the display part as two-layer structure and allow no gap between both of the aforementioned electrodes when viewed from the front face of the display element. Furthermore, a configuration is to form a film of a pattern feature for displaying on one of counter electrodes within a cell and give a difference of drive voltages for changing states of the liquid crystal in regions of the pattern and on the outside thereof, thereby turning On-Off the display only in one zone of the pattern and outside thereof.

The adoption of the above described method makes it possible to form a color so as to bury an Off display color completely in the background color by using a low cost electrode structure in a display of a cholesteric liquid crystal, thereby improving a suitability to an industrial design and accomplishing a display of a high visibility.

BRIEF DESCRIPTION OF DRAWINGS

FIG. 6 is a diagram describing an electrode pattern of a cholesteric LCD element according to a first embodiment;

FIG. 7 is a diagram describing a transparent state, a reflection state generated by applying an electrical field, and a reflection state generated by a mechanical action, in a cholesteric liquid crystal;

FIG. 8 is a front view diagram of a cholesteric LCD element according to a second embodiment;

FIG. 11C is a diagram showing a color combination of a pattern and a flat type pattern and of a cholesteric LCD element according to the third embodiment;

FIG. 12 is a diagram describing a method for driving a cholesteric LCD element according to the third embodiment;

FIG. 13 is a diagram describing an example of performing a segment display by using a cholesteric LCD element according to the third embodiment;

DESCRIPTION OF THE PREFERRED EMBODIMENTS

The following is a description of the preferred embodiment of a cholesteric LCD element (sometimes noted as "display element" hereinafter) according to the present invention by referring to the accompanying drawings.

Figure 5:
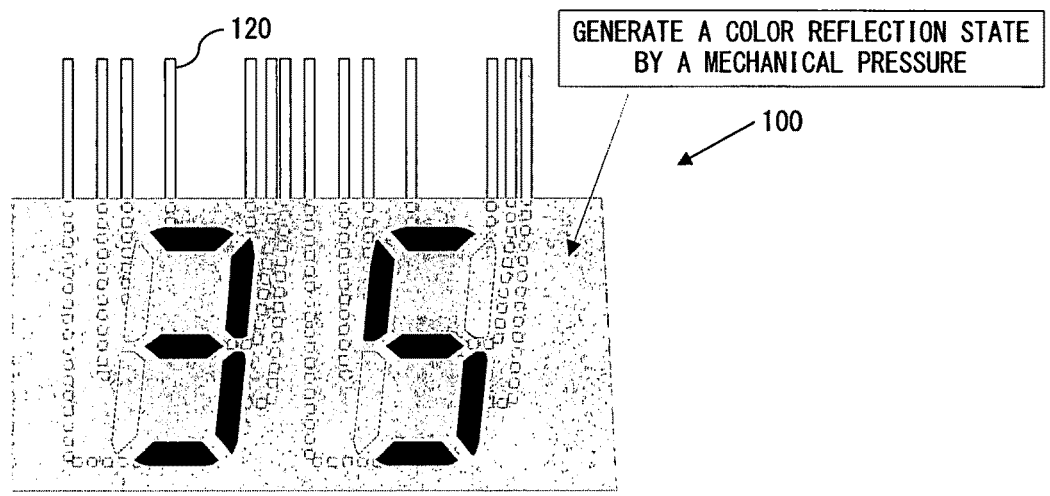
FIG. 5 is a front view diagram of a cholesteric LCD element according to a first embodiment.

FIGS. 5 through 7 are diagrams for describing a first embodiment of the present invention.

FIG. 5 is a front view diagram of a display element 100 according to the first embodiment, in which the liquid crystal at a background part is fixed to a color reflection state by using a mechanical pressure including a part on a segment wiring. Therefore, an Off display color is buried in the background. The mechanical pressure is applied to the entire surface of the display surface by using a roller apparatus (i.e., a laminator apparatus), or a press apparatus, after injecting the liquid crystal into the cell during the production process of the display element.

FIG. 6 is a diagram describing a segment electrode pattern 110 and a common electrode pattern 160 according to the first embodiment. The common electrode pattern 160 is configured to be opposite to the segment electrode pattern 110 and so as to prevent a display change in the area on the wiring of segment lead wires 120 as shown in the drawing. Therefore, a counter electrode does not exist in the background including a part on the segment wiring, thereby making a state of the background part staying in a color refection state, which is fixed during the production, even after a usage start.

Figure 1:
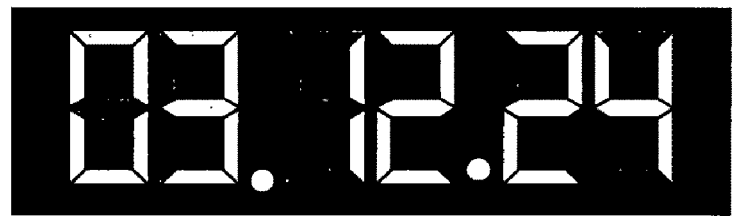
FIG. 1 is a diagram showing a conventional display element of which a background is black.
Figure 2:
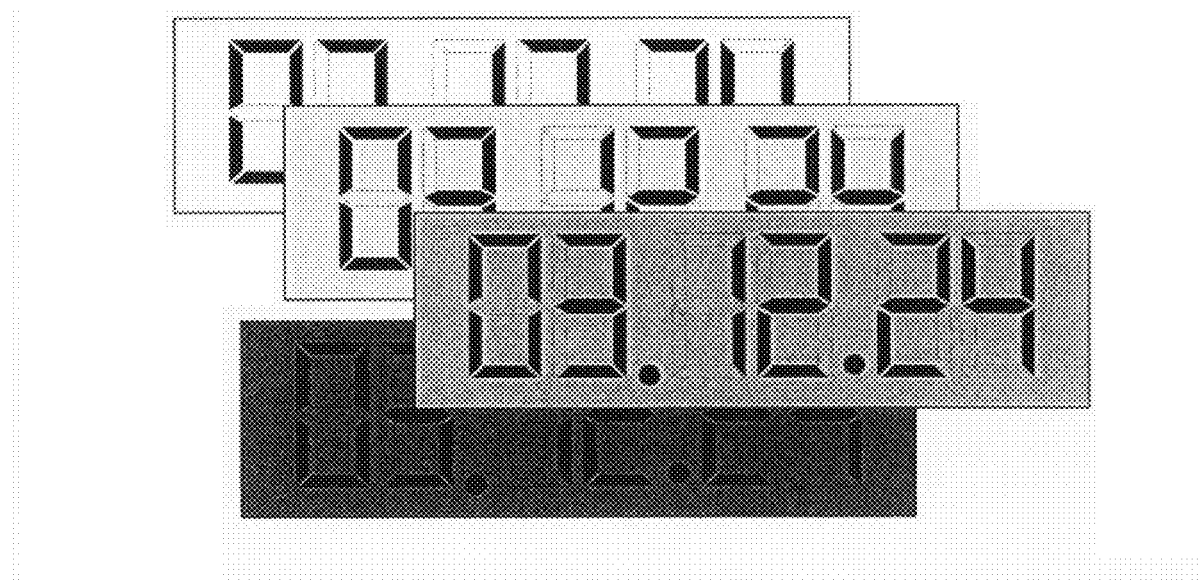
FIG. 2 is a diagram exemplifying a display element colorizing a background.
Figure 3:
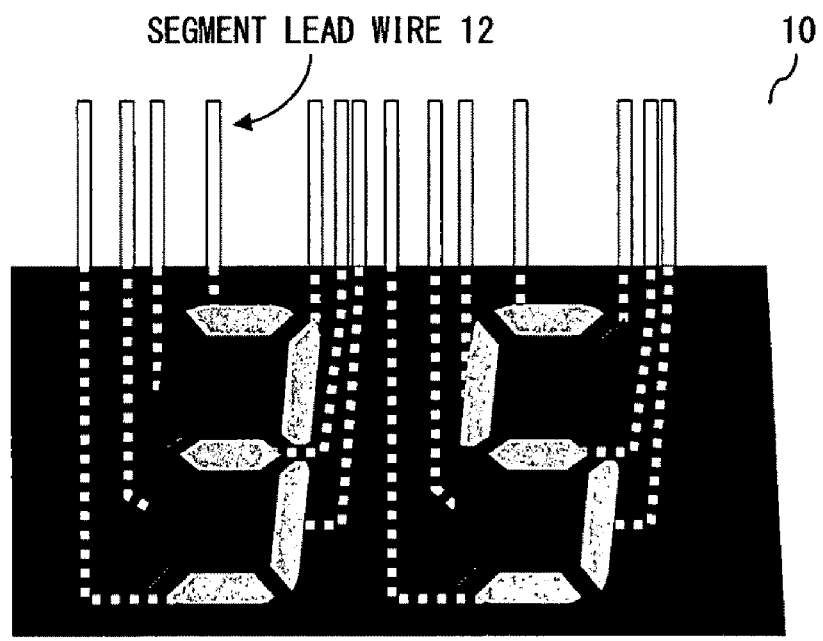
FIG. 3 is a diagram of a conventional cholesteric LCD element viewed from the front.
Figure 4:
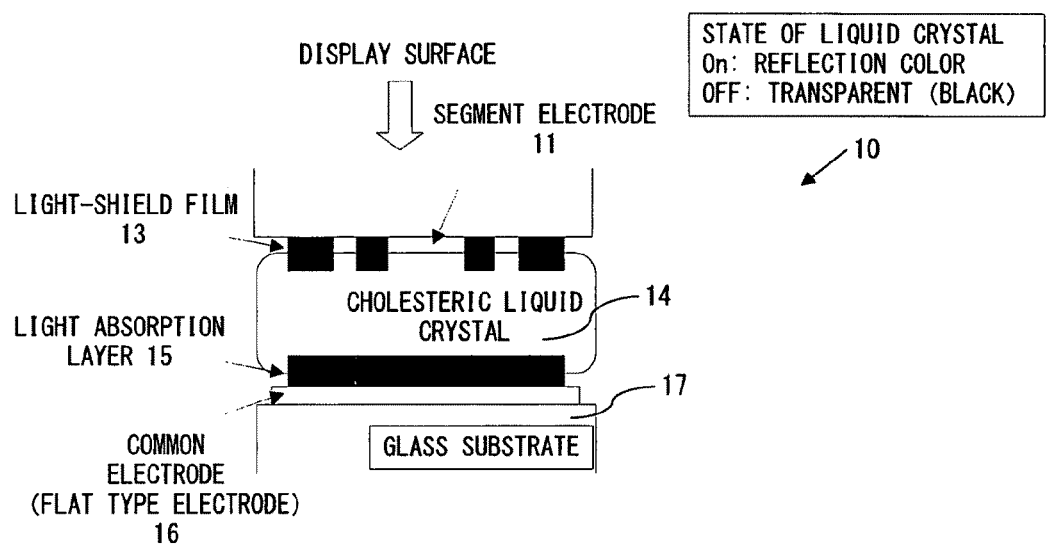
FIG. 4 is a cross-sectional diagram of a conventional cholesteric LCD element.

Note here that there is no longer a necessity of the light-shield film 13 equipped in the display element 10 of a conventional example noted in FIGS. 3 and 4, for all embodiments put forth herein.

FIG. 7 is a diagram describing a transparent state, a reflection state generated by applying an electrical field, and a reflection state generated by a mechanical action, in a cholesteric liquid crystal. As shown in the drawing, the reflection state generated by applying an electrical field has a little difference in the state of the liquid crystal from the reflection state generated by a mechanical action. This sometimes makes a hue of the background different from that of the display color (i.e., an Off display color), causing a little dissatisfaction in the visibility.

Figure 9:
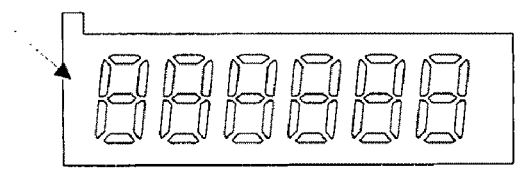
FIG. 9 is a diagram showing a structure of an outer circumference electrode of a cholesteric LCD element according to the second embodiment.
Figure 10:
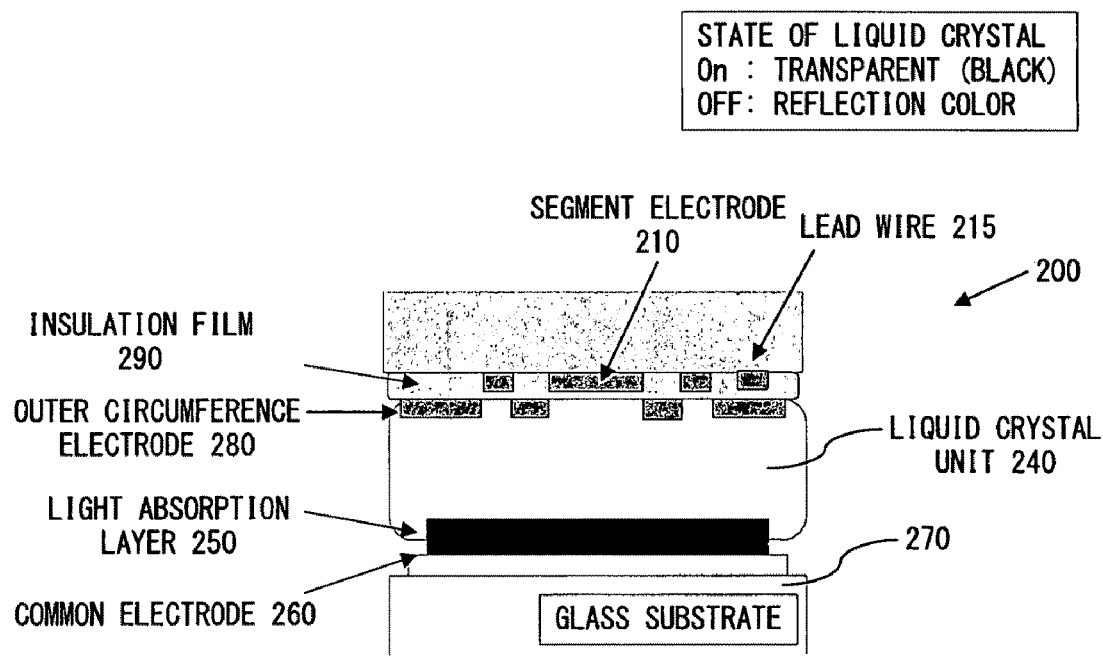
FIG. 10 is a diagram showing a cross-section of a cholesteric LCD element according to the second embodiment.

The next is a description of a second embodiment by referring to FIGS. 8 through 10.

FIG. 8 is a front view diagram of a display element 200 according to the second embodiment. The second embodiment is configured to use an outer circumference electrode 280 (shown in FIG. 9) for a background color use, and therefore FIG. 8 differs from the front view of FIG. 5, showing the first embodiment, where there is an outer circumference electrode lead wire 285.

FIG. 9 is a diagram showing a structure of the outer circumference electrode 280. The structure of the outer circumference electrode 280 is a rectangle for example and is a result of coring out the part of a position, where a segment electrode exists, from an electrode having no particular pattern (i.e., a flat type electrode).

FIG. 10 is a diagram showing a cross-section of a display element 200 according to the second embodiment. A common electrode 260 is formed on a glass substrate 270, and a light absorption layer 250 is formed on the common electrode 260. Formed on the display surface side is an electrode pattern of a two-layer structure, i.e., a layer comprising a segment electrode 210 and a lead electrode 215 and a layer of the outer circumference electrode 280, by way of an insulation film 290, and a gap with the common electrode 260 side is featured with a liquid crystal unit 240 which is filled with a cholesteric liquid crystal. On the glass substrate 270 of the common electrode 260 side, a flat type electrode pattern is generated. The state of the liquid crystal is transparent (i.e., black) at the time of an On display of the segment, and is the same reflection color as the background color at the time of an Off display. In the second embodiment, an Off reflection color and background color of the segment are completely identical, thereby improving a visibility. And a reversing changeover between negative and positive displays can easily be implemented by choosing an electrode to apply an electrical field between the segment electrode (210) and outer circumference electrode (280). Because the outer circumference electrode 280 is in the inner layer of the lead electrode 215, the background is not affected by the lead electrode.

Therefore, a various application can be conceived, such as reversing negative and positive displays at a set time or between the morning and afternoon.

The next is a description of a third embodiment by referring to FIGS. 11A through 13.

The third embodiment is configured to form a film of a pattern feature to be displayed on one of counter electrodes within a cell in a display element using a cholesteric liquid crystal, which changes a state based on an applied electrical field. The pattern feature gives a difference of electric field strength using a drive voltage under which a liquid crystal changes a state in regions of the pattern and outside thereof, and cause a transition from the color reflection state to transparent state, or vice versa, either only in the pattern or outside thereof. Therefore, this enable an On-Off the display either only in the pattern or outside thereof.

Figure 11A:
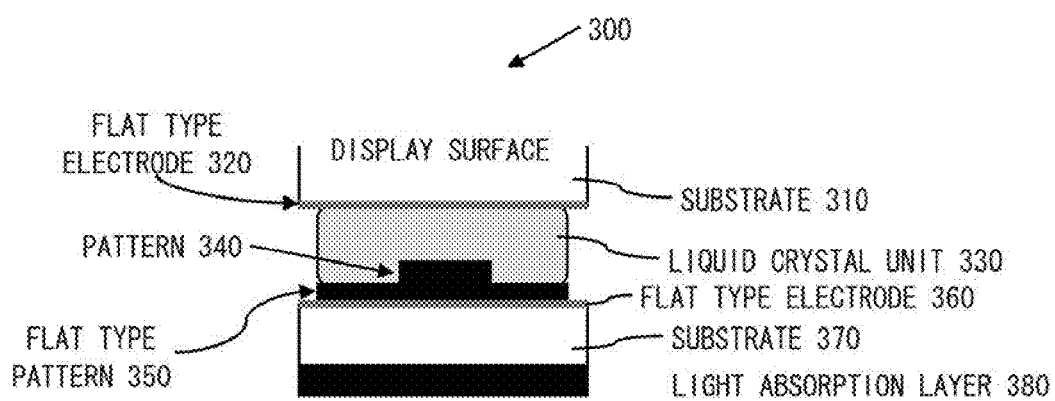
FIG. 11A is a diagram showing a cross-section of a cholesteric LCD element according to a third embodiment.
Figure 11B:
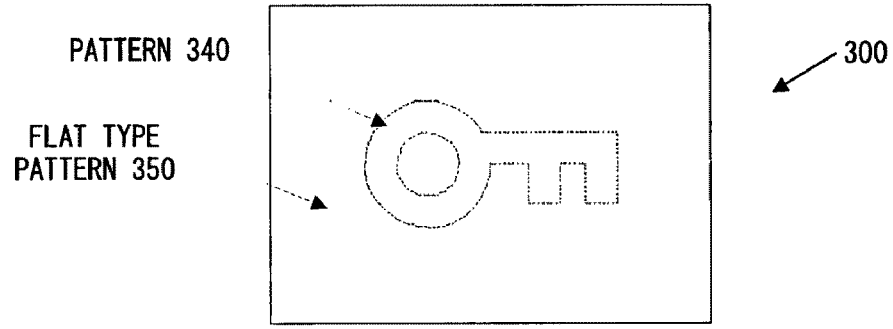
FIG. 11B is a diagram of a cholesteric LCD element, viewed from a display surface side, according to the third embodiment.

The next is a description of a configuration of the display element according to the third embodiment by referring to FIGS. 11A through 11C.

FIG. 11A is a diagram showing a cross-section of a display element 300 according to the third embodiment. Layered are, from the display surface side, an upper substrate 310, an upper flat type electrode 320, a liquid crystal unit 330, a pattern 340, a flat type pattern 350, a lower flat type electrode 360, a lower substrate 370 and a light absorption layer 380.

FIG. 11B is a diagram of the display element, viewed from a display surface side, according to the third embodiment, exemplifying a key mark as a pattern 340.

FIG. 11C is a diagram showing a combination of color tones of the pattern 340 and the flat type pattern 350. A combination of both black of (1) shows a clear contrast, enabling an elimination of a light absorption layer 380. In terms of design, however, four combination between black and transparent can be adopted, enabling a utilization of an oriented film or insulation film as a transparent layer. The transparent layer may be configured by not forming a film, or, if both of the pattern 340 and periodical pattern 350 are transparent, either one of them may be configured by not forming a film.

The next is a description of a drive method, and a display state, of the cholesteric LCD element 300 according to the third embodiment by referring to FIG. 12. The initial state prior to an application of a voltage is assumed to be a color reflection state. The graph noted as "single layer BK" shows a relationship of an applied voltage with a reflectance of a liquid crystal in the part of the flat type pattern 350 constituted by one layer of black, and the graph noted as "two-layer BK" shows a relationship of an applied voltage with a reflectance of a liquid crystal in the part constituted by two layers of black with the pattern 340 being protruded.

When an applied voltage is at V1, the part of the single layer BK is transparent (i.e., black) and the part of the two-layer BK is a reflection color, thus becoming a positive On state; and when the applied voltage is at V2, both of the part of the single layer BK and two-layer BK is transparent (i.e., black), thus becoming a positive Off state. When the applied voltage is at V3, the part of the single layer BK is a reflection color and the part of the two-layer BK is transparent (i.e., black), thus becoming a negative On state and displaying a key mark in the color background. When the applied voltage is at V4, both of the part of the single layer BK and two-layer BK is a reflection color, becoming a negative Off state.

The above embodiment has been described by assuming the mark display part as two layers and the background part as one layer; it is, however, apparent that a configuration of the mark display part being one layer and the background part being two layers makes it possible to display the same. In the case of configuring the transparent layer as not forming a film, a mark display part becomes one layer or a background part becomes one layer.

FIG. 13 is a diagram describing an example of performing a segment display in seven segments by using a cholesteric LCD element according to the third embodiment. The use of the cholesteric LCD element according to the third embodiment for each segment enables a segment display as shown in FIG. 13. The flat type electrode can be configured to conceal a segment border by making a two-layer structure likewise the segment electrode 210 and outer circumference electrode 280 of the second embodiment.

Figure 14:
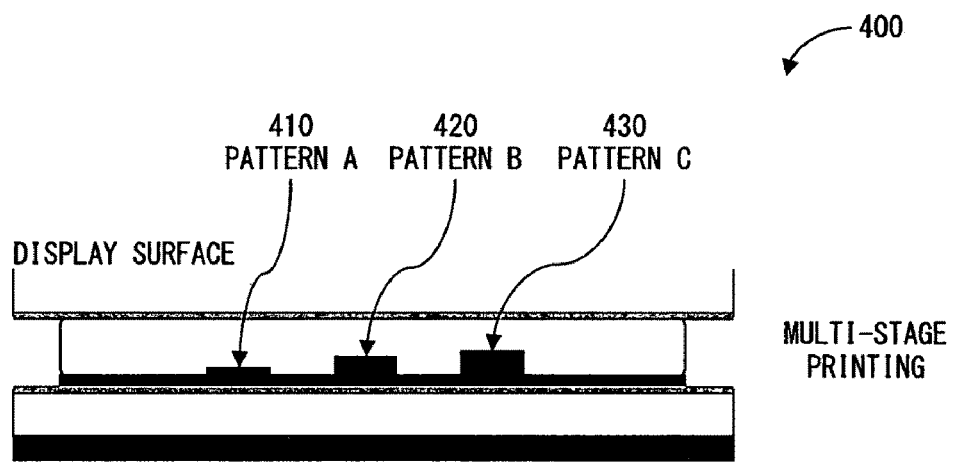
FIG. 14 is a diagram showing a cross-section of a cholesteric LCD element according to a fourth embodiment.
Figure 15:
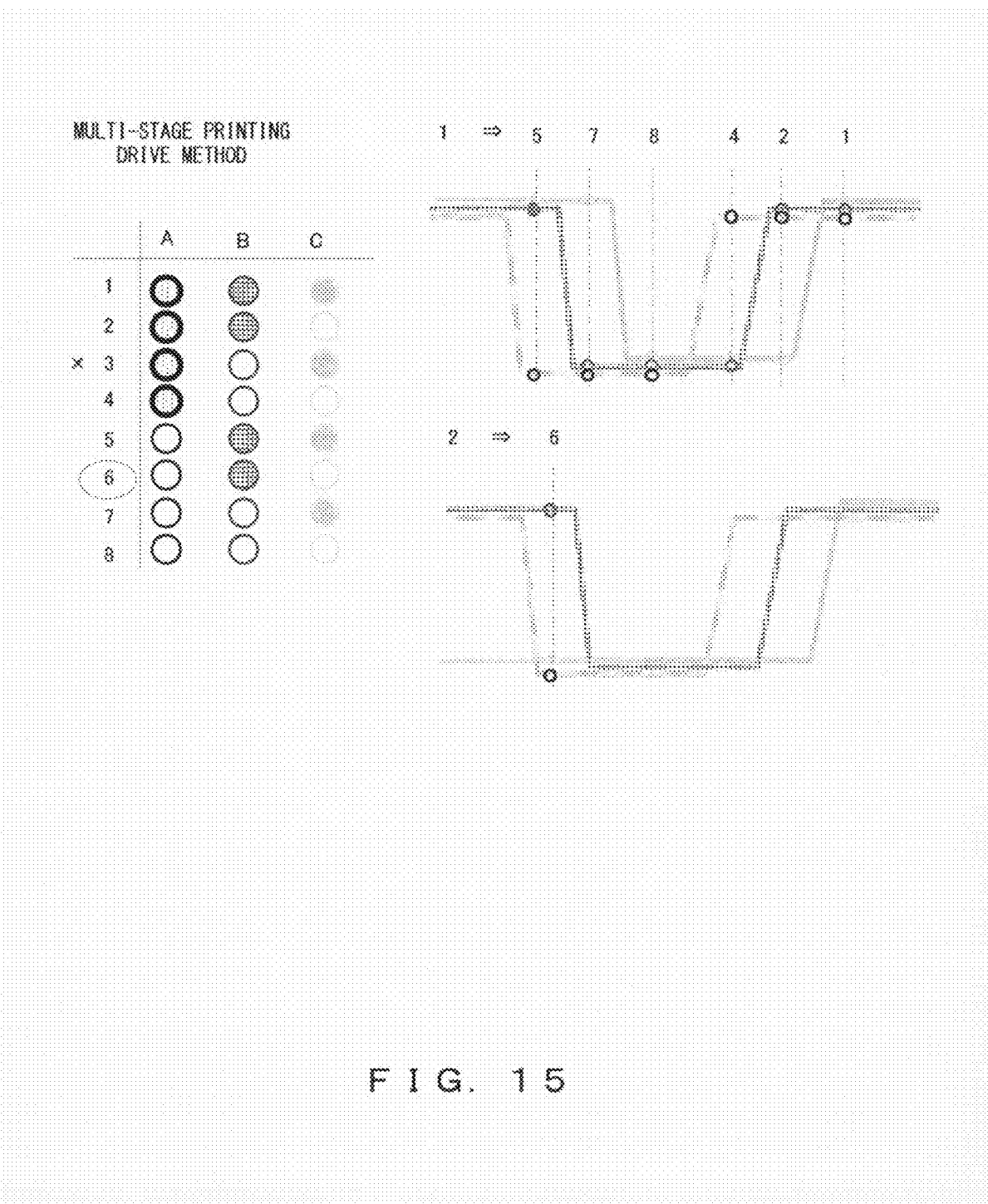
FIG. 15 is a diagram describing a method for driving a cholesteric LCD element according to the fourth embodiment.

The next is a description of a fourth embodiment of the present invention by referring to FIGS. 14 and 15.

FIG. 14 is a diagram showing a cross-section of a cholesteric LCD element 400 according to the fourth embodiment. As compared to the cholesteric LCD element of the third embodiment shown in FIG. 11A, the difference lies in printing a pattern on the flat type pattern in multiple stage thicknesses. FIG. 14 exemplifies the case of three patterns, i.e., the pattern A 410, pattern B 420 and pattern C 430.

FIG. 15 is a diagram describing a method for driving the cholesteric LCD element 400 according to the fourth embodiment configured as described above. Since the present configuration is printed with three kinds of patterns A, B and C, eight kinds of display patterns can exist in terms of mathematics as combinations of On and Off; in actuality, however, the display pattern 3 in which only the pattern B 420 is turned Off can not be implemented, and the display pattern 6 in which only the pattern B 420 is turned On requires some devising.

Assuming that the initial state prior to applying a voltage is a color reflection state, a drive starts with the state of the display pattern 1. Increasing the applied voltage initially constitutes the state of the display pattern 5 as a result of the pattern A 410 becoming transparent, that is, turned Off. Then, as the applied voltage is increased, the display patterns transits from the pattern 7 to 8 to 4 to 2, followed by returning to the display pattern 1. In order to carry out a display of the display pattern 6, the power is turned off in the state of the display pattern 2, followed by applying the voltage in the state of the display pattern 2, in which only the pattern C 430 is transparent, as the initial state. This turns the part of the pattern A 410 into transparent ahead of the part of the pattern B, and the display pattern 6 in which only the pattern B 420 is a color reflection state can be achieved.

Therefore, a positive display can be achieved by switching over three ways of display patterns by using the display patterns 4, 6 and 7.

As described above, the present invention is contrived to make it possible to bury an Off display color in a colorized background, thereby enabling a positive response to a requirement of an industrial design suitability by utilizing a display element according the present invention in industrial fields putting emphasis on an industrial design suitability such as clocks, marker displays, et cetera, which require a colorful background as background colors.

The first embodiment is configured to be able to fix a background color by using a mechanical pressure, thereby eliminating a necessity of an electrode for a background color. This accordingly eliminates a necessity of controlling a voltage of a background color-use electrode.

The second embodiment is configured to make it possible to drive a background part including a part on the segment wiring, thereby making an Off reflection color of the segment completely identical with the background color and improving the visibility. Also a reversing changeover between negative and positive displays can easily be implemented by selecting an electrode for applying the electrical field between the segment electrode and outer circumference electrode.

The third embodiment is configured to make an electrode pattern as a flat type pattern and make it possible to form a display pattern such as a mark by employing a simple process for forming a flat type pattern and a pattern on the aforementioned flat type pattern of the electrode.

The fourth embodiment provides benefit of obtaining a more complex display effect in addition to the benefit of the third embodiment.

What is claimed is:

1. A display element using a cholesteric liquid crystal possessing bistability states including a color reflection state and a transparent state, comprising:
    a pair of counter electrodes, one counter electrode of the pair of counter electrodes having a first electrode surface, another counter electrode of the pair of counter electrodes having a second electrode surface opposing the first electrode surface, the pair of counter electrodes applying a drive voltage to the cholesteric liquid crystal positioned between the first electrode surface and the second electrode surface; and
    a film of a pattern feature for displaying, formed on a portion of the first electrode surface, wherein
    the counter electrodes create a potential difference between the first electrode surface and the second electrode surface, and
    states of the cholesteric liquid crystal transit from a color reflection state to a transparent state, or vice versa, only in a first area between the film and the second electrode surface or a second area between the first electrode surface excluding a region where the film is formed and the second electrode surface so as to display the pattern feature in accordance with an electric field strength difference between a first electric field strength generated at the first area by the potential difference and a second electric field strength generated at the second area by the potential difference, the electric field strength difference being brought by the film formed on the portion of the first electrode surface.

2. The display element according to claim 1, wherein the one counter electrode of the pair of counter electrodes having the first electrode surface is a flat type electrode.

3. The display element according to claim 2, wherein
    a plurality of the films are formed on the first electrode surface,
    each of the plurality of the films is formed as a segment of a segment display,
    the one counter electrode of the pair of counter electrodes is divided into a plurality of divided electrode regions so that each of the plurality of divided electrode regions includes one of the plurality of the films, and
    the driving voltage is applied to the cholesteric liquid crystal using one or more of the divided electrode regions, thereby enabling the segment display to be displayed by the cholesteric liquid crystal.

4. The display element according to claim 1, wherein
    an uniform black layer is formed on an electrode surface of the one counter electrode of the pair of counter electrodes having the first electrode surface, and
    the film of the pattern feature is a transparent or black layer formed on a portion of the uniform black layer.

5. The display element according to claim 1, wherein the film of the pattern feature is a black layer.

6. The display element according to claim 4, wherein a negative and positive reversing display is carried out by controlling the drive voltage.

7. The display element according to claim 1, wherein
    a plurality of films of the pattern feature are formed,
    cholesteric liquid crystal in between regions of the plurality of patterns and in a region on the outside of the plurality of patterns has a different drive voltage for changing states according to each region, and
    states of the cholesteric liquid crystal transit from a color reflection state to a transparent state, or vice versa, only in one zone of the zones of the respective of the plurality of patterns or the zone on the outside thereof is made.

* * * * *